Figure 8:
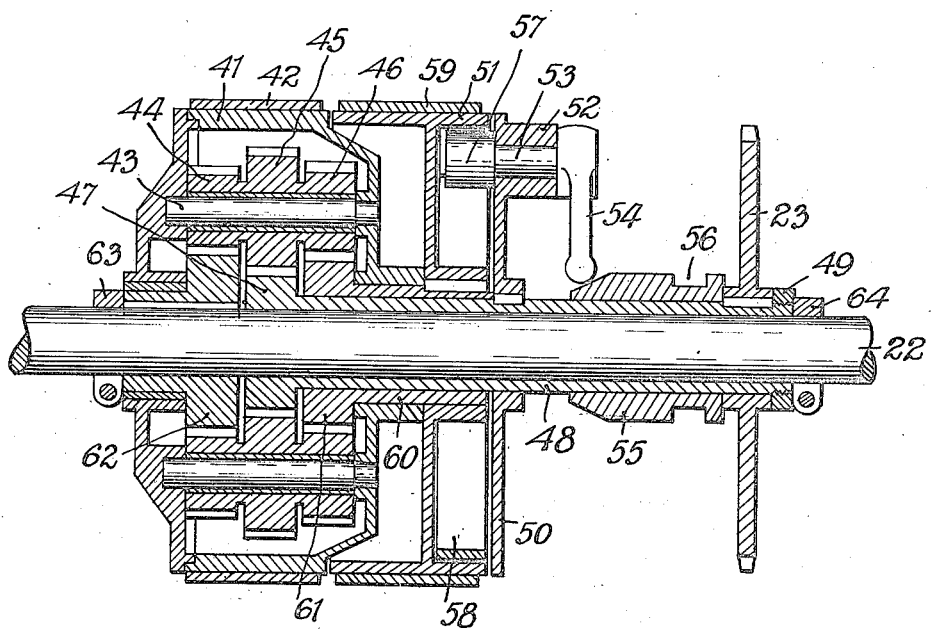

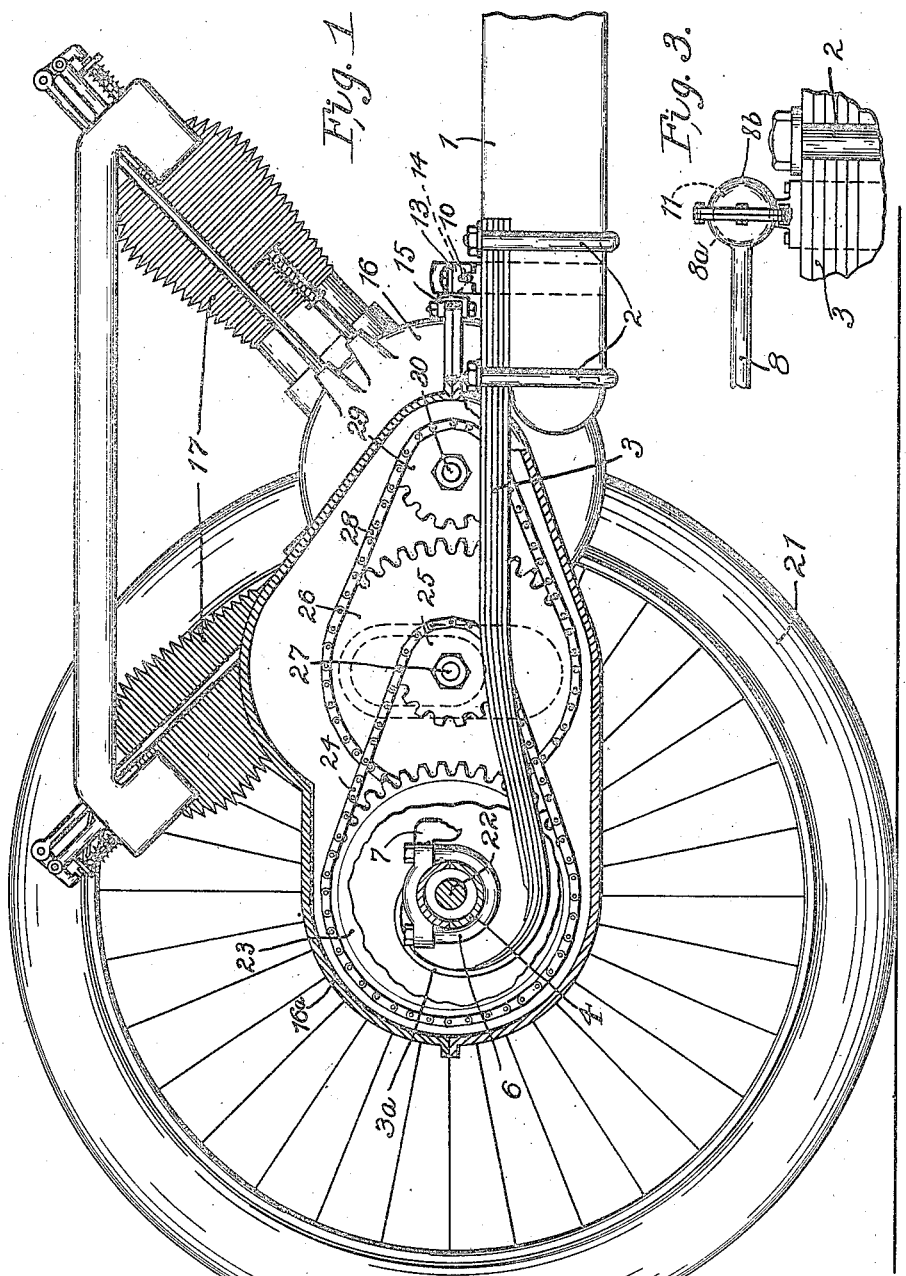

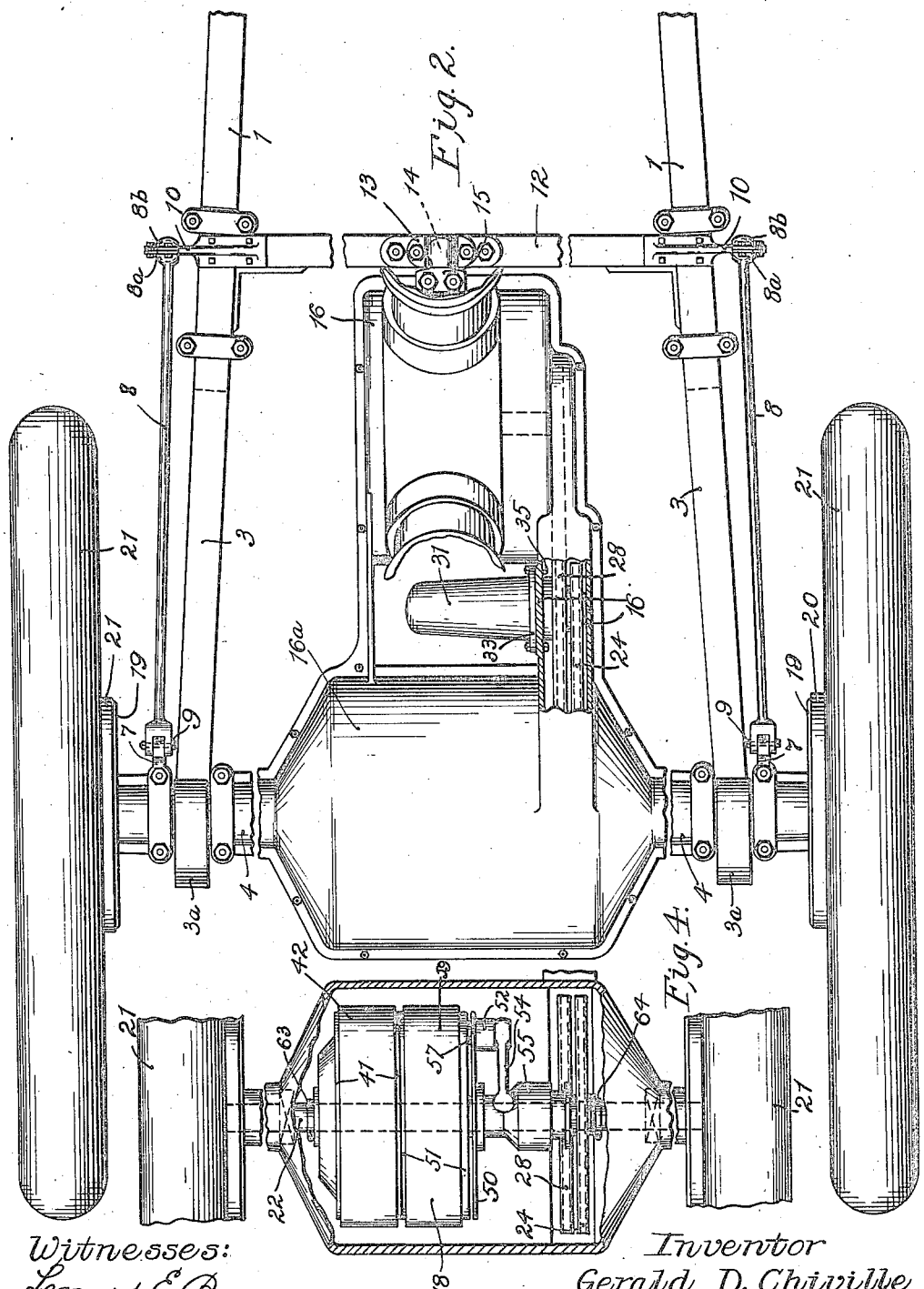

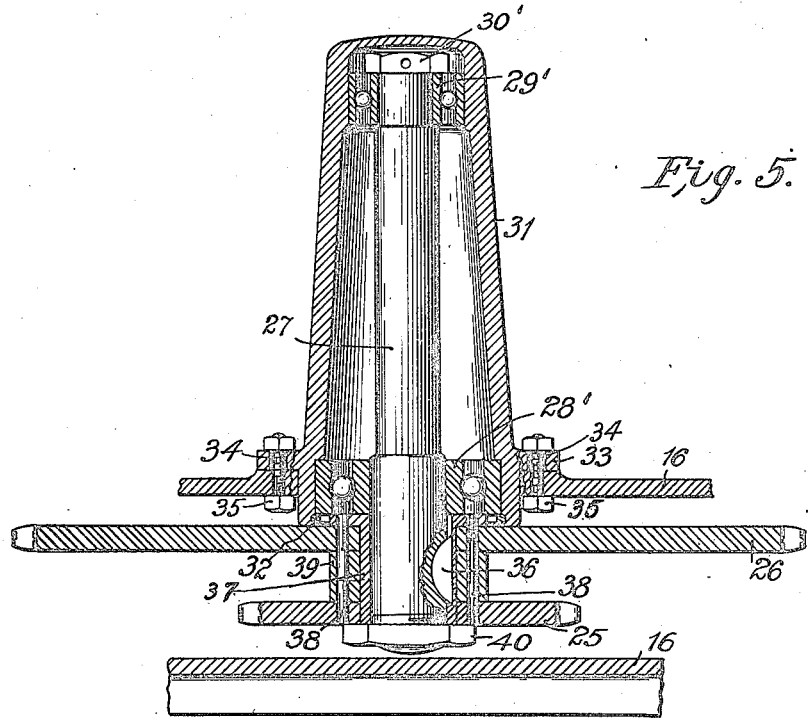
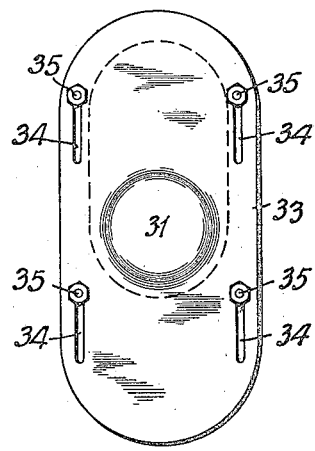
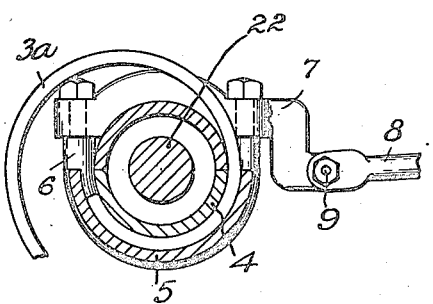

G. D. CHIVILLE.
MOTOR VEHICLE CONSTRUCTION.
APPLICATION FILED DEC. 12, 1913.

1,165,848.

Patented Dec. 28, 1915.
4 SHEETS—SHEET 4.

UNITED STATES PATENT OFFICE.

GERALD D. CHIVILLE, OF CHICAGO, ILLINOIS.

MOTOR-VEHICLE CONSTRUCTION.

1,165,848.        Specification of Letters Patent.        Patented Dec. 28, 1915.

Application filed December 12, 1913. Serial No. 806,205.

*To all whom it may concern:*

Be it known that I, GERALD D. CHIVILLE, a citizen of the United States, residing at Chicago, in the county of Cook and State of Illinois, have invented certain new and useful Improvements in Motor-Vehicle Constructions, of which the following is a full, clear, concise, and exact description, reference being had to the accompanying drawings, forming a part of this specification.

My invention relates to an improved construction for motor vehicles, pertaining particularly to the suspension of the engine and the construction of the driving axle of the vehicle, as a result of which compactness and lightness is secured.

My invention is particularly applicable to narrow tread motor vehicles, of the so-called cycle car type, since it permits the parts to be of comparatively small weight, intimately associates the engine with the driving shaft, and supports substantially all of the weight of the engine upon the springs of the vehicle.

The several features of my invention will appear more particularly by reference to the several drawings, which are as follows:

Figure 1 shows in side elevation the driving axle and engine of a motor vehicle constructed in accordance with my invention, together with a portion of the framework of the vehicle supporting the engine. Fig. 2 is a plan view of the parts shown in Fig. 1. Fig. 3 is a detail view of the connection of one end of one of the radius rods. Fig. 4 shows in a view similar to Fig. 2 a portion of the driving axle and driving wheels together with the transmission casing broken away to show the internal mechanism. Fig. 5 is a central sectional view taken through the countershaft of the driving train. Fig. 6 is an end view of the countershaft housing. Fig. 7 is a vertical sectional view through the driving axle at its point of support of one of the springs connected with the framework of the vehicle. Fig. 8 is a central longitudinal sectional view through the transmission gearing mounted upon the driving axle.

Similar numerals refer to similar parts throughout the several views.

As shown in Figs. 1 and 2, the framework of the vehicle 1 has secured to its rear end at either side by U-bolts 2, a leaf spring 3 of such construction that the top of the framework 1 is somewhat lower than the center of the axle 4 to which the end of the spring 3 is attached. It will be noted that the springs are bent so that they extend downward near their ends and then are curved upward and around the top of the axle 4, the extreme end of the outer leaf 3ª of the spring being extended around the axle 4 and clamped against its outer lower surface by means of the semi-circular plate 5 secured at its ends to the U-bolts 6, as shown in Fig. 7, so that when the U-bolts are drawn up snugly into proper position, they hold the end of the leaf 3ª of the spring 3 securely against the axle 4 and at the same time hold the cap 7 firmly in place upon the axle to receive the rear end of the radius rod 8, which is pivotally connected thereto at 9. The forward end of each radius rod is connected with a bracket 10 secured by suitable bolts to the frame 1 and, in order that the radius rod may move freely about its point of support, the bracket 10 carries a ball 11, as indicated in Fig 3, around which the end of the radius rod is secured by having its end 8ª formed in the shape of a hemisphere having an outwardly extending flange to be secured by suitable bolts to a similar flange extending from a hemispherical cap 8ᵇ. As a result of this construction, when the parts are bolted together, the end of the radius rod forms a hollow sphere which is a free sliding fit on the sphere formed on the bracket 10.

The brackets 10 are secured to the frame 1 at the point where a cross-bar 12 extends across the frame to support, near its middle, the right-hand end of the engine and driving gearing by means of a ball and socket joint, this construction consisting in a bearing 13 carried by the bar 12 and a spherical head 14 secured by a yoke 15 to the flanges of the engine casing 16, as indicated in Figs. 1 and 2. The engine casing 16 is constructed in two parts, the upper part of which carries the two cylinders 17 which, together with the controlling mechanism for running the engine, may be of any well-known construction and forms no part of the present invention. The axle end of the casing 16 is enlarged, as indicated, at 16ª, to inclose the transmission and reversing gearing 18 which is mounted directly upon the driving axle. The portion 16ª of the casing is conically shaped at its ends and terminates in tubular portions extending outwardly from the casing to form the rigid portion 4 of the axle for receiving the ends of the springs 3 and for supporting the inner members 19 of the brakes 20 secured to the driving wheels 21. The casing 16ᵃ need not be integrally formed with the tubular extensions 4, for, if it is preferred to construct these parts separately, they may be secured together in any well-known manner, as, for example, by making the tubular extensions of steel tubing and holding them in place by the clamping action of the two halves of the rear portion 16ᵃ of the casing. If preferred, however, these parts may be made integrally.

The wheels 21 are rigidly connected together by a driving axle 22, upon which the transmission and reversing gearing 18 is mounted. This gearing is driven by a sprocket wheel 23 by means of a chain 24 from a sprocket pinion 25, which is rigidly secured to a sprocket wheel 26 rotatably mounted upon the counter-shaft 27. The sprocket wheel 26 is engaged by a chain 28 which drives said sprocket wheel by rotation of the sprocket pinion 29 secured to the engine shaft 30.

The construction of the countershaft 27 and the manner of its support will be more clearly understood by reference to Figs. 5 and 6. The countershaft 27 is extended a considerable distance through the side plate 16 of the casing and carries the inner members of ball bearings 28′ and 29′ near the sprocket wheel 26 and at the opposite end of the shaft, respectively. These inner members of the ball bearings are held securely in place on the countershaft either by being a tight fit thereon or by means of a nut, as indicated at 30′. The outer members of the ball bearing 28′ and 29′ are supported by a conical bracket or housing 31 having cylindrical seats formed in the opposite ends of its bore for receiving with a free sliding fit the outer members of said ball bearings. A spring ring 32 is inserted in a suitable groove in the larger end of the bore of the bracket 31 to hold the bearing 28′ in place and thus to hold the entire countershaft in place in said bracket, for, when the ring is removed, the countershaft with all of the parts carried thereby may be readily drawn from the bracket for inspection or repair. The bracket or housing 31 is preferably continuous at its outer end, as indicated, so that the bearings contained therein are wholly inclosed when the countershaft is in place in the housing so that the bearings are protected from dust and dirt. The bracket 31 has formed therein a vertically elongated flange 33, having four vertical slots 34 formed near its side edges to receive the supporting bolts 35, which extend through the side wall of the casing 16. As a result of this construction, when the chains and sprocket wheels wear somewhat, the slack may be taken up by loosening the bolts 35 and moving the countershaft vertically a sufficient distance to compensate for the wear. The slots and supporting bolts are preferably so located that this compensation for wear will properly take up the slack of both of the chains at the same time. The outer end of the countershaft 27 has secured to it by means of a key 36 a sleeve 37, to the inner flange of which the sprocket wheels 25 and 26 are secured by pins 38, there being a tubular spacer 39 between said sprocket wheels to keep them at the proper distance apart. A nut 40 is provided to hold the sprocket wheel unit and sleeve in place upon the countershaft so as to permit its removal when desired.

The transmission gearing 18 is best shown in Fig. 8 and consists of a casing 41, surrounded by a band brake 42 and, in this casing, is mounted a plurality of horizontal shafts 43, each carrying a gear unit consisting of three gears 44, 45 and 46. As the shafts 43 and the gear units carried by them are identical, but one will be described as to its structure and operation. The gear 45 meshes with a gear 47 carried by the left-hand end of a sleeve 48, to the right-hand end of which the sprocket wheel 23 is secured by means of a key, as indicated. A threaded collar 49 serves to hold the sprocket wheel 23 in place upon its key. The sleeve 48 has secured thereto, by means of a key as indicated, a disk 50 which forms the right-hand inclosing wall of the brake element 51. The disk 50 has extending outwardly therefrom near its periphery a boss 52, forming the bearing for a short shaft 53, to the outer end of which is secured an operating lever 54 for engagement by means of the operating cam 55, slidably mounted upon the sleeve 48 and provided with a groove 56 for receiving a suitable operating device of any form well-known in the art. The inner end of the shaft 53 has secured thereto a cam 57 for spreading the internal brake band 58 into positive engagement with the brake shell 51 when the lever 54 is operated by movement of the cam 55 to the left. The brake shell 51 is surrounded by a brake band 59 and is secured, by means of a suitable key, to a sleeve 60 rotatably mounted upon the sleeve 48 and carrying at its left-hand end a gear 61 meshing with the gear 46. The gear 44 meshes with a gear 62 provided with an extending hub, as indicated, to form one of the bearings for the rotary casing 41, the other side of which is supported by the sleeve 60. Collars 63 and 64 are secured to the driving axle 22 so as to prevent motion of the transmission and reversing gearing longitudinally upon the shaft. The gears 44 and 46 are shown of smaller diameter than the gear 45 and the gear 44 is shown as of slightly smaller diameter than the gear 46, but it will be understood that I do not limit myself to any particular proportions of these gears. I have not shown in the present application any particular means for operating the brake bands 42 and 59 for these devices may be actuated by any means well-known in the art, as they do not constitute part of the present invention.

The transmission and reversing gearing, as a result of the construction described, operates as follows: When the brake band 42 is set against the casing 41 to prevent rotation of said casing, the gear 47, driven by the sprocket wheel 23, drives the gear 45 which, in turn, drives the gear 62 rigidly connected with the shaft 22. Owing to the proportions of the gears, this speed may be a low speed of operation of the vehicle. When it is desired to increase the speed, the brake band 42 is released to permit rotation of the casing 41 and the brake band 58 is set against the inner surface of the brake shell 51 by operation of the cam 55, which locks the sleeve 60 to the sleeve 48 and through casing 41, and causes these parts— namely, the sleeve 48 and the sleeve 60 and the casing, to rotate together, and, therefore, drives the shaft 22 in precisely the same manner as though for this condition the sprocket wheels 23 were rigidly connected directly with the shaft 22. When it is desired to reverse the direction of motion of the vehicle, the brake bands 42 and 58 are released and the brake band 59 is set against the outer surface of the brake shell 51 to prevent rotation thereof and, for this condition, the gear 45 is driven, as before, by means of the sprocket wheel with the difference, however, that, since the gear 61 is prevented from rotating, the effect upon the gear 62 is to rotate it in the opposite direction from what it was rotated for the two previous running conditions.

From the above, it will appear that I provide a construction of motor vehicle in connection with which all of the change gearing for securing different speeds and for reversing the direction of motion of the vehicle is mounted directly upon the driving axle, thus reducing the amount of gearing required for the vehicle to a minimum. While I have described the driving wheels as rigidly secured to the driving axle, it will be understood that I do not limit myself to this mode of securing the driving wheels, as many forms of mechanical devices may be employed, if desired, which will not rigidly secure the driving wheels to the axle, as, for example, one of the wheels may be freely mounted upon the driving axle or, if preferred, pawl and ratchet mechanism may be introduced between the wheel and axle so as to allow any desired degree of variation in the rate of rotation of one wheel relatively to the other, as may be required, for example, in turning the vehicle around or going around a corner.

I do not limit myself to the exact mechanical constructions shown and described, but, on the other hand, may employ any equivalent devices for carrying out my invention.

What I claim is:—

1. In a motor vehicle, the combination of a framework, an engine supported thereby, a driving axle, a spring support connecting the framework with the axle, a loosely mounted driving pinion mounted on said driving axle, driving means connecting the engine with said pinion, and speed changing gears mounted on said driving axle for operatively connecting said driving pinion and said driving axle.

2. In a motor-driven vehicle, the combination of a framework, a driving axle, a spring support connecting the framework and axle, an engine carried by the framework, a countershaft driven by the engine, driving connections between the countershaft and the axle, and a support for the countershaft movable in a direction to take up the wear of the gearing extending from the engine to the axle.

3. In a motor-driven vehicle, the combination of a driving axle, traction wheels mounted upon the axle, speed-changing gears mounted directly upon and concentric with said axle and a casing revoluble on said shaft, said casing containing said speed changing gear and rotating about said shaft.

4. In a motor-driven vehicle, the combination of a driving axle, traction wheels mounted upon the axle, and gearing mounted upon and carried by said axle and concentric therewith for changing the speed of rotation of said axle for the same speed of operation of the prime mover and for reversing the direction of rotation of said axle when desired.

5. In a motor-driven vehicle, the combination of a driving axle, traction wheels mounted upon the axle, gearing mounted upon and carried by said axle for changing the speed of rotation of said axle for the same speed of operation of the prime mover and for reversing the direction of rotation of said axle when desired, and brake clutches for changing the operative condition of said gearing as desired.

6. In a motor-driven vehicle, the combination of a driving axle, driving wheels mounted upon the axle, gearing mounted upon and carried by said axle for changing the speed of rotation of said axle for the same speed of operation of the prime mover and means to engage and hold stationary a part of said gearing for reversing the direction of rotation of said axle when desired, an engine carried by the framework, a sprocket on said axle, said sprocket connected to said gearing and a chain drive from said engine to said sprocket.

7. In combination, an engine, a countershaft, a driven shaft, driving chains connecting the engine and driven shaft with said countershaft, and a bearing for said countershaft movable to compensate for wear on the chain gearing, and clamping devices for holding the said bearing in a desired adjustment.

8. In combination, an engine, a countershaft, a driven shaft, driving chains connecting the engine and driven shaft with said countershaft, said countershaft and driven shaft being substantially in alinement with the shaft of the engine, a bearing for the countershaft movable transversely of a line extending through the engine shaft and the driven shaft, a support for said bearing, and clamping devices for securing the bearing to said support in any desired position.

9. In combination, a countershaft carrying a driving and a driven wheel both located at one end of said shaft, two bearings for said shaft, a support for said countershaft located adjacent to said wheels, and a housing for said bearings extending away from said support, said housing being movable relatively to the support to adjust the position of said countershaft.

10. In combination, a countershaft, driven and driving wheels secured to and carried by said countershaft, two bearings carried by said countershaft, a housing for said countershaft having surfaces for engaging said bearings with a sliding fit, and a locking device for holding said bearings in place in said housing, removal of said locking devices permitting the withdrawal of the countershaft and bearings from said housing.

11. In combination, a countershaft carrying driving and driven wheels, two ball bearings carried by said countershaft, a housing for said bearings having surfaces slidably engaging the outer members of said ball bearings, and a locking device for holding the bearings in position in said housing, removal of said locking device permitting said countershaft and said ball bearings to be removed as a unit from said housing.

12. In a motor-driven vehicle, the combination of a frame, a driving axle, a spring supporting the frame from the axle below the level thereof, said spring being below the level of said axle, an engine carried by the frame and above the top thereof, and driving connections extending from the engine to the axle.

In witness whereof, I hereunto subscribe my name this 10th day of December, A. D., 1913.

GERALD D. CHIVILLE.

Witnesses:
ALBERT C. BELL,
AUGUST H. L. ARNDT.